United States Patent [19]

Okawa et al.

[11] Patent Number: 5,053,899
[45] Date of Patent: Oct. 1, 1991

[54] EXACT POSITION CONTROL OF A RELATIVE POSITION BETWEEN A MAGNETIC HEAD AND A RECORDING MEDIUM

[75] Inventors: Yoshihisa Okawa; Terumitsu Okamoto, both of Tokyo, Japan

[73] Assignee: NEC Corporation, Tokyo, Japan

[21] Appl. No.: 219,545

[22] Filed: Jul. 15, 1988

[30] Foreign Application Priority Data

Jul. 15, 1987 [JP] Japan .................................. 62-177643
Jul. 30, 1987 [JP] Japan .................................. 62-191785
Sep. 11, 1987 [JP] Japan .................................. 62-226645

[51] Int. Cl.$^5$ .............................................. G11B 5/596
[52] U.S. Cl. ................................ 360/77.08; 360/77.02
[58] Field of Search .............. 360/77.01, 77.02, 77.04, 360/77.05, 77.07–77.11, 77.14, 77.15

[56] References Cited

U.S. PATENT DOCUMENTS 4,188,646 2/1980 Sordello et al. ................... 360/77.08
4,424,543 1/1984 Lewis et al. ...................... 360/77.08
4,843,493 6/1989 Furuhata et al. ................. 360/77.15

*Primary Examiner*—Aristotelis M. Psitos
*Assistant Examiner*—Steven R. Garland
*Attorney, Agent, or Firm*—Sughrue, Mion, Zinn, Macpeak & Seas

[57] ABSTRACT

For controlling a relative position between a magnetic head (15) and a recording medium (10) having a control area (14) indicative of a tracking axis for the magnetic head, a position controlling unit comprises a producing arrangement (28) for producing a position signal, and a control arrangement (29) for controlling the relative position in response to the position signal in a predetermined direction which intersects the tracking axis. More particularly, the producing arrangement comprises a first producing, a second producing, and a processing arrangements (31, 32, 33). Responsive to the detection signal, the first producing arrangement produces a first signal. The processing arrangement processes the first signal into a second signal. Responsive to the first and the second signals, the second producing arrangement produces the position signal. Preferably, the control area has a main area (17) indicative of the tracking axis, and a supplementary area (18) preceding the main area. The magnetic head is for detecting the main and the supplementary areas to produce a main and a supplementary detection signal which collectively serves as the detection signal.

8 Claims, 6 Drawing Sheets

EXACT POSITION CONTROL OF A RELATIVE POSITION BETWEEN A MAGNETIC HEAD AND A RECORDING MEDIUM

BACKGROUND OF THE INVENTION

This invention relates to a position controlling unit for controlling a relative position between a recording medium, such as a magnetic disk, and a magnetic head for use in carrying out recording or reading operation, namely, access operation to the recording medium.

A magnetic disk has a central axis and a plurality of concentric tracking axes around the central axis substantially on a recording plane. Each of the tracking axes is for defining a data area. In other words, the data area extends along each of the tracking axes. Various information is recorded in the data area and is accessed by the magnetic head.

In order to access each of the data areas, the magnetic head is movable in a predetermined direction which intersects the tracking axes and extends parallel to the recording plane. Before start of the access operation, the magnetic head is placed on a selected one of the tracking axes. It is necessary for a reliable access operation to exactly control a relative position between the magnetic head and the recording medium.

The magnetic disk has a control area which is indicative of each of the tracking axes. The control area can also be accessed by the magnetic head. Placed on the control area, the magnetic head produces a detection signal. Responsive to the detection signal, the relative position is controlled by a position controlling unit in the manner known in the art.

A conventional position controlling unit is disadvantageous in that it is hard to exactly control the relative position.

SUMMARY OF THE INVENTION

It is therefore an object of the present invention to provide a position controlling unit which is capable of exactly controlling a relative position between a magnetic head and a recording medium.

Other object of this invention will become clear as the description proceeds.

According to this invention, there is provided a position controlling unit for controlling a relative position between a magnetic head and a recording medium having a predetermined tracking axis and a control area indicative of the predetermined tracking axis. The magnetic head is for detecting the control area to produce a detection signal. The unit includes producing means responsive to the detection signal for producing a position signal representative of the relative position, and control means responsive to the position signal for controlling the relative position in a predetermined direction which intersects the predetermined tracking axis and which extends along the recording medium. In the position controlling unit, the producing means comprises first internal producing means coupled to the magnetic head and responsive to the detection signal for producing a first internal signal, processing means coupled to the first internal producing means for processing the first internal signal into a second internal signal, and second internal producing means coupled to the first internal producing and the processing means and responsive to the first and the second internal signals for producing the position signal.

DESCRIPTION OF THE PREFERRED EMBODIMENT

Figure 1:
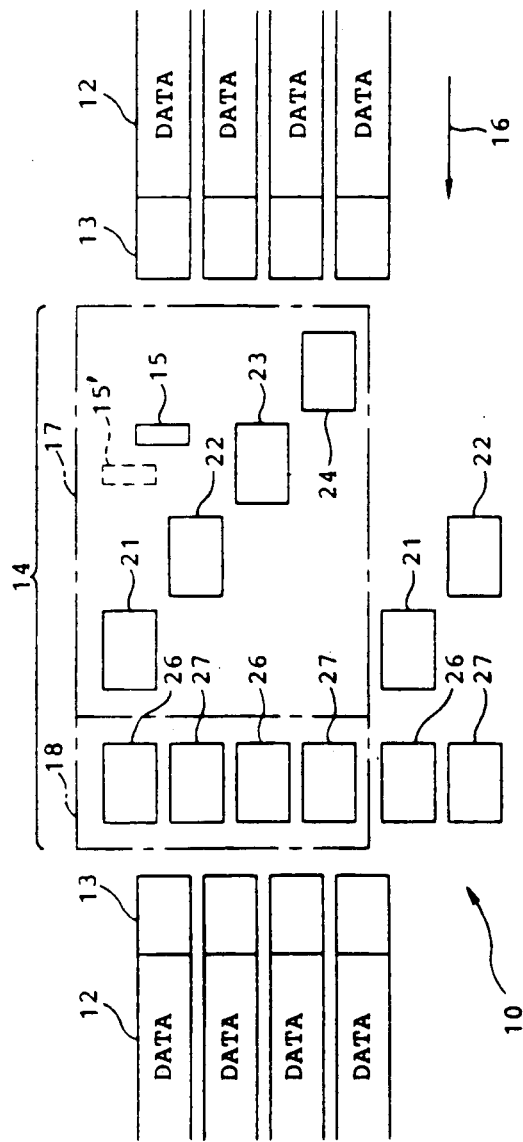
FIG. 1 shows, together with a magnetic head, a partial top view of a recording medium.

Referring to FIG. 1, description will be made at first in relation to a recording medium for use in a magnetic recording system including a position controlling unit according to this invention. The recording medium may be a flexible magnetic disk 10 which is known as a floppy disk and will herein be called a magnetic floppy disk. The magnetic floppy disk 10 is substantially planar along a recording plane and has a central axis perpendicular to the recording plane and a plurality of concentric tracking axes around the central axis.

The magnetic floppy disk 10 has a plurality of data areas 12, a plurality of gap areas 13, and a plurality of control areas 14. The data areas 12 are for magnetically recording various information by a magnetic head 15 in the manner known in the art. The various information can be accessed by the magnetic head 15 in the manner known in the art, whereby the magnetic head 15 produces a read out signal. Each of the data areas 12 extends along each of the tracking axes. With one of the control areas 14 left in common to a few tracking axes, each data area 12 has axial ends in a first predetermined direction which is normal to the tracking axis and extends along the recording plane of the magnetic floppy disk 10. The gap areas 13 are continuous to the respective axial ends of the data area 12. Each of the control areas 14 is for use in controlling a relative position between the magnetic floppy disk 10 and the magnetic head 15 in a second predetermined direction which is tangential to the tracking axis. The words "normal" and "tangential" may be referred to as "perpendicular" and "parallel".

On accessing the tracking axes either for record of information or read out of the information, the magnetic floppy disk 10 is rotated in a predetermined sense 16 around the central axis by a disk driving device (not shown). As will later become clear, the magnetic head 15 produces a detection signal on accessing each of the tracking axes in response to one of the control areas 14 that intersects the tracking axis being accessed.

Each of the control areas 13 comprises main and supplementary areas 17 and 18. The main area 17 is indicative of the tracking axis. The supplementary area 18 is displaced from the main area 17 in the predetermined sense 16. When the magnetic floppy disk 10 is rotated in the predetermined sense 16, the supplementary area 18 is accessed first and subsequently the main area 17 so that the supplementary area 18 precedes the main area 17. In this event, the magnetic head 15 produces a main and a supplementary detection signal collectively as the detection signal on accessing the main and the supplementary areas 17 and 18.

The main area 17 comprises first through fourth data parts 21, 22, 23, and 24. The first through the fourth data parts 21 to 24 are displaced from one another both in the first and the second predetermined directions. More particularly, the first through the fourth data parts 21 to 24 are arranged in a predetermined third direction which intersects the first and the second predetermined directions and extends along the recording plane. As will be clear from FIG. 1, the first data part 21 precedes the second data part 22 in the predetermined sense 16. The second data part 22 precedes the third data part 23 in the predetermined sense 16. The third data part 23 precedes the fourth data part 24 in the predetermined sense 16. Each tracking axis extends between two adjacent ones of the first through the fourth data parts 21 through 24. It is to be noted in this connection that each of the first through the fourth data parts 21 to 24 has a particular pattern of a plurality of north and south poles which extend in the first predetermined direction and alternate in the second predetermined direction with a preselected period. When each of the first through the fourth data parts 21 to 24 is accessed, the magnetic head 15 produces a data part detection signal as the main detection signal.

The supplementary area 18 comprises two primary identification parts 26, and two secondary identification parts 27. The primary and the secondary identification parts 26 and 27 are arranged in the first predetermined direction. Each tracking axis extends between two adjacent ones of the identification parts 26 and 27, respectively. The two adjacent identification parts 26 and 27 collectively serve to indicate respective positions of the first through the fourth data parts 21 to 24 in the second predetermined direction. It is to be noted in this connection that each of the primary identification parts 26 has a first pattern and that each of the secondary identification parts 27 has a second pattern. The first pattern is made of a plurality of north and south poles which extend in the first predetermined direction and alternate in the second predetermined direction with a first preselected period. The second pattern is made of a plurality of north and south poles which extend in the first predetermined direction and alternate in the second predetermined direction with a second preselected period. The first and the second patterns are therefore different from each other. The second preselected period is shorter than the first preselected period. When the primary and the secondary identification parts 26 and 27 are accessed, the magnetic head 15 produces a first and a second supplementary detection signal which are superposed to each other. The first and the second supplementary detection signals collectively serve as the supplementary detection signal.

Figure 2:
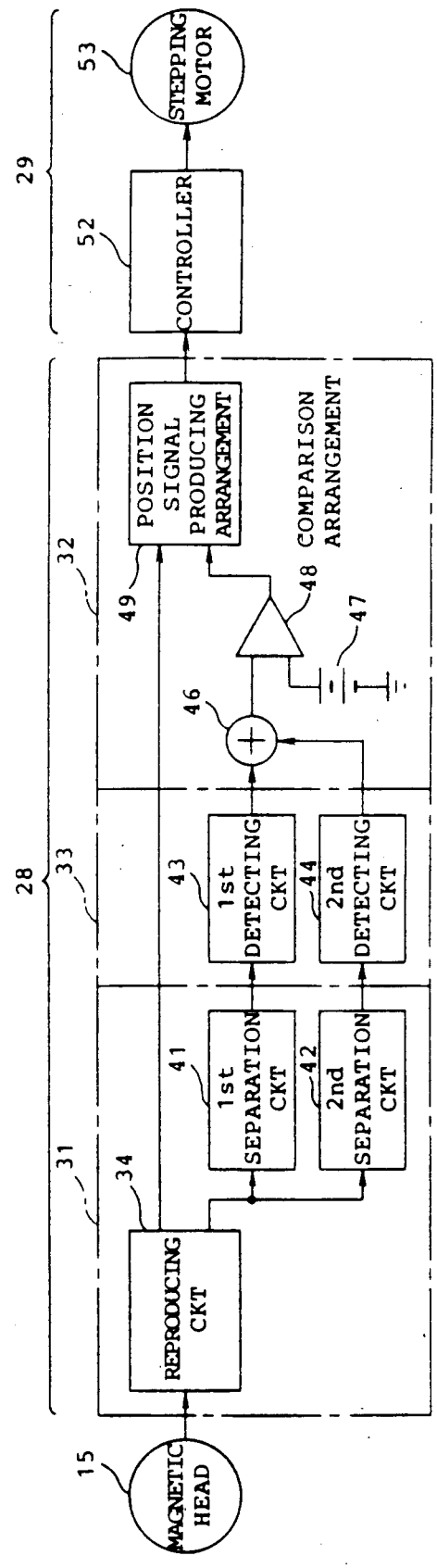
FIG. 2 is a block diagram of a position controlling unit according to a first embodiment of this invention.

Referring to FIG. 2 together with FIG. 1, a position controlling unit according to a first embodiment of the present invention comprises producing and control arrangements 28 and 29. The producing arrangement 28 is for producing a position signal in response to the above-mentioned detection signal in the manner which will later be described in detail. Responsive to the position signal, the control arrangement 29 controls the relative position between the magnetic head 15 and the magnetic floppy disk 10 in the first predetermined direction.

The producing arrangement 28 comprises first internal producing, second internal producing, and processing arrangements 31, 32, and 33. The first internal producing arrangement 31 is coupled to the magnetic head 15 and is for producing a first internal signal in response to the detection signal. The processing arrangement 33 is coupled to the first internal producing arrangement 31 and is for processing the first internal signal into a second internal signal. The second internal producing arrangement 32 is coupled to the first internal producing and the processing arrangements 31 and 33 and is for producing the position signal in response to the first and the second internal signals.

Figure 3:
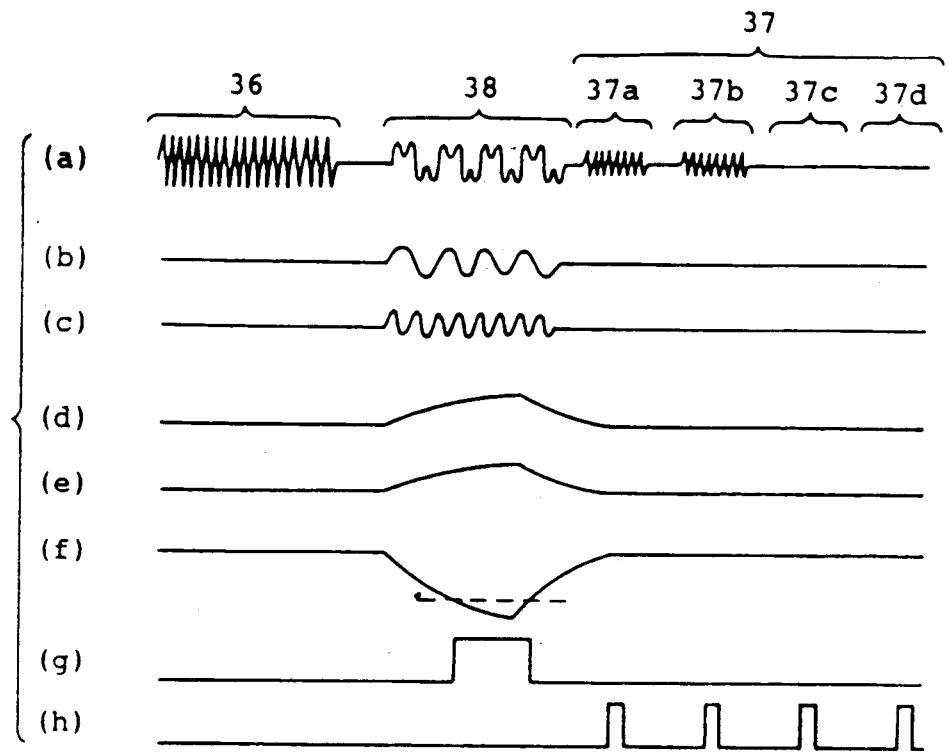
FIG. 3 is a time chart for use in describing operation of the position controlling unit illustrated in FIG. 2.

Referring to FIGS. 2 and 3, the first internal producing arrangement 31 comprises a reproducing circuit 34. Responsive to the read out and the detection signals, the reproducing circuit 34 produces a reproduced signal. Supplied with the read out signal, the reproducing circuit 34 produces a reproduced read out signal 36 depicted along a top line labelled (a). Supplied with the main detection signal, the reproducing circuit 34 serves as a main producing arrangement to produce a main local signal 37 depicted along the top line. Supplied with the supplementary detection signal, the reproducing circuit 34 serves as a supplementary producing arrangement to produce a supplementary local signal 38 depicted along the top line. The reproduced read out, the main local, the supplementary local signals are collectively called the reproduced signal.

When the magnetic head 15 accesses each of the first through the fourth data parts 21, 22, 23, and 24, the producing circuit 34 produces each of first, second, third, and fourth data part local signals 37a, 37b, 37c, and 37d which have an intensity level dependent on intensity of the data part detection signals. When the magnetic head 15 accesses each of the primary identification parts 26, the reproducing circuit 34 serves as a first supplementary producing arrangement to produce a first supplementary local signal in response to the first supplementary detection signal. When the magnetic head 15 accesses each of the secondary identification parts 27, the reproducing circuit 34 serves as a second supplementary producing arrangement to produce a second supplementary local signal in response to the second supplementary detection signal. It will be assumed merely for clarity of illustration that the first preselected period is equal to twice the second preselected period.

A case will be described where the magnetic head 15 exactly accesses a selected one of the data areas 14 that is depicted at the top in FIG. 1. In this case, the magnetic head 15 accesses the two adjacent identification parts 26 and 27. Therefore, the reproducing circuit 34 produces a superposed signal which is a combination of the first and the second supplementary local signals and which is schematically illustrated at 38 in FIG. 3 along a top line labelled (a). The first and the second supplementary local signals collectively serve as the supplementary local signal 38.

In addition, the intensity level of each of the first and the second data part local signals 37a and 37b has a reference value. The intensity level of each of the third and the fourth data part local signals 37c and 37d has a low value, namely, zero. This is because the magnetic head accesses only the first and the second data parts 21 and 22. The first and the second data part local signals 37a and 37b collectively serve as the main local signal 37.

The first internal producing arrangement 31 further comprises first and second separation circuits 41 and 42. The reproduced signal is supplied to the first and the second separation circuits 41 and 42. The first separation circuit 41 is for separating only the first supplementary local signal from each of the reproduced read out, the main local, and the second supplementary local signals. The first supplementary local signal is depicted in FIG. 3 along a line labelled (b). The second separation circuit 42 is for separating only the second supplementary local signal from each of the reproduced read out, the main local, and the first supplementary local signals. The second supplementary local signal is depicted along a line labelled (c). The first and the second supplementary local signals are discriminated from one another and are supplied to the processing arrangement 33. A combination of the first and the second selection circuits 41 and 42 is referred to herein as a discriminating arrangement.

The processing arrangement 33 comprises first and second detecting circuits 43 and 44. The first detecting circuit 43 is for detecting the first supplementary local signal and produces a first local detection signal depicted along a line labelled (d). The second detecting circuit 44 is for detecting the second supplementary local signal and produces a second local detection signal depicted along a line labelled (e). The first and the second local detection signals collectively serve as the second internal signal and are supplied to the second internal producing arrangement 32. A combination of the first and the second detection circuits 43 and 44 is referred to as an internal processing arrangement.

The second internal producing arrangement 32 comprises calculation, determining, and comparison arrangements 46, 47, and 48. The calculation arrangement 46 is for carrying out a predetermined calculation, such as addition with polarity conversion, on the first and the second local detection signals and produces a result signal depicted in FIG. 3 along a line labelled (f). The determining arrangement 47 is for determining a reference signal having a constant level depicted by a horizontal dashed line. A value of the result signal is compared with the level of the reference signal in the comparison arrangement 48. Only when the value of the result signal is lower than the level of the reference signal, the comparison arrangement 48 produces an information signal depicted along a line labelled (g). A combination of the determining and the comparison arrangements 47 and 48 is referred to herein as a local producing arrangement. A combination of the calculation, the determining, the comparison arrangements 46, 47, and 48 is referred to herein as a carrying out arrangement.

The second internal producing arrangement 32 further comprises a position signal producing arrangement 49. The position signal producing arrangement 49 is supplied with the information and the reproduced signals. The information signal is processed in the position signal producing arrangement 49 into an intermittent succession of pulse signals depicted along a line labelled (h). Each of the pulse signals is indicative of an instant of time when the first through the fourth data part local signals 37a through 37d appear in the top line (a). Responsive to each of the pulse signals, the position signal producing arrangement 49 measures the intensity levels of the first and the second data part local signals 37a and 37b to produce the position signal in the manner known in the art.

The control arrangement 29 comprises a controller 52 and a stepping motor 53. Responsive to the position signal, the controller 52 produces a control signal. Responsive to the control signal, the stepping motor 53 controls the magnetic head 15 in the first predetermined direction in the manner known in the art.

Figure 4:
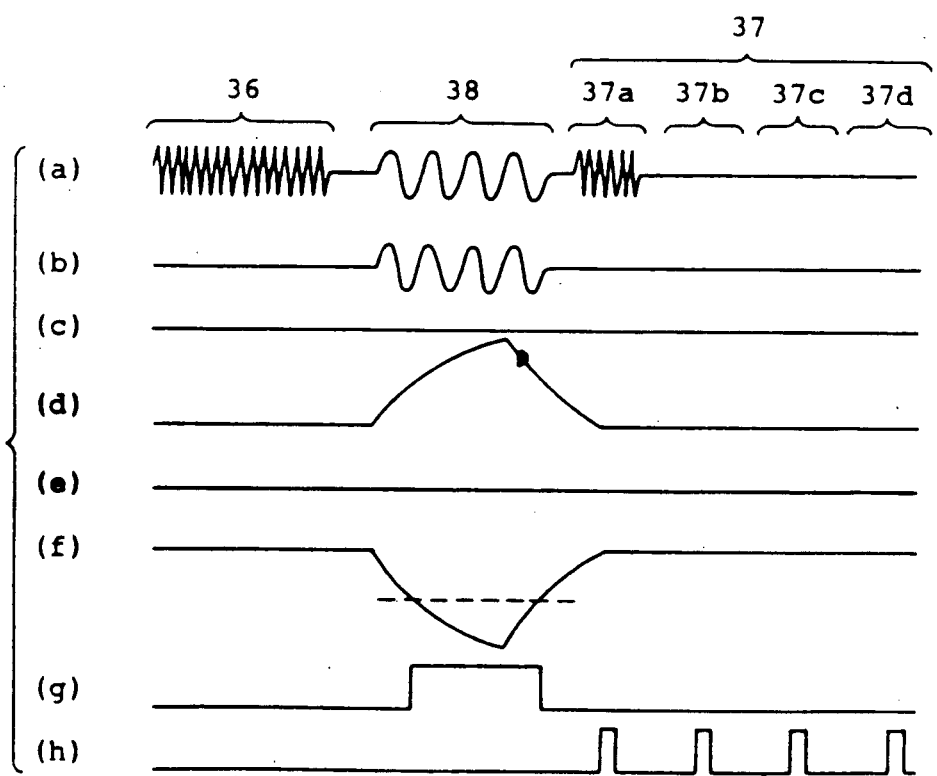
FIG. 4 is another time chart for use in describing operation of the position controlling unit illustrated in FIG. 2.

Referring to FIG. 4, description will be directed to another case where the magnetic head is placed on a particular position depicted by a reference numeral 15' in FIG. 1. In this case, the magnetic head 15' accesses only the first data and the primary identification parts 21 and 26 in the control area 17 during rotation of the magnetic floppy disk 10. Therefore, the reproducing circuit 34 produces only the first data part and the first supplementary local signals in addition to the reproduced read out signal 36 as depicted along a top line labelled (a). In this event, the intensity level of the first data part local signal 37a has a high value higher than the reference value. It is to be noted that the intensity level of the second through the fourth data part local signals 37b through 37d has the low value, typically, zero.

Like in FIG. 3, the pulse signals are produced dependent on the first supplementary local signal as depicted along a line labelled (h). Description will be omitted as regards the signals along lines labelled (b), (c), (d), (e), (f), and (g). Responsive to the pulse signals, the position signal producing arrangement 49 carries out the predetermined operation with reference to the levels of the first and the second data part local signals to produce the position signal. In this case, the position signal is representative of displacement of the magnetic head 15' from the predetermined tracking axes in the first predetermined direction. Responsive to the position signal, the control arrangement 29 controls the relative position in the manner which is described referring to FIG. 3.

While the description is made as regards the selected data area 14, it is a matter of course that the position controlling unit is capable of exactly controlling the relative position for each of other data areas by using the second through the fourth data parts 22 to 24. Even if the magnetic head 15 has a position error which is greater than the tracking axis pitch, it is possible to correct the relative position with reference to the first through the fourth data part local signals 37a to 37d.

Figure 5:
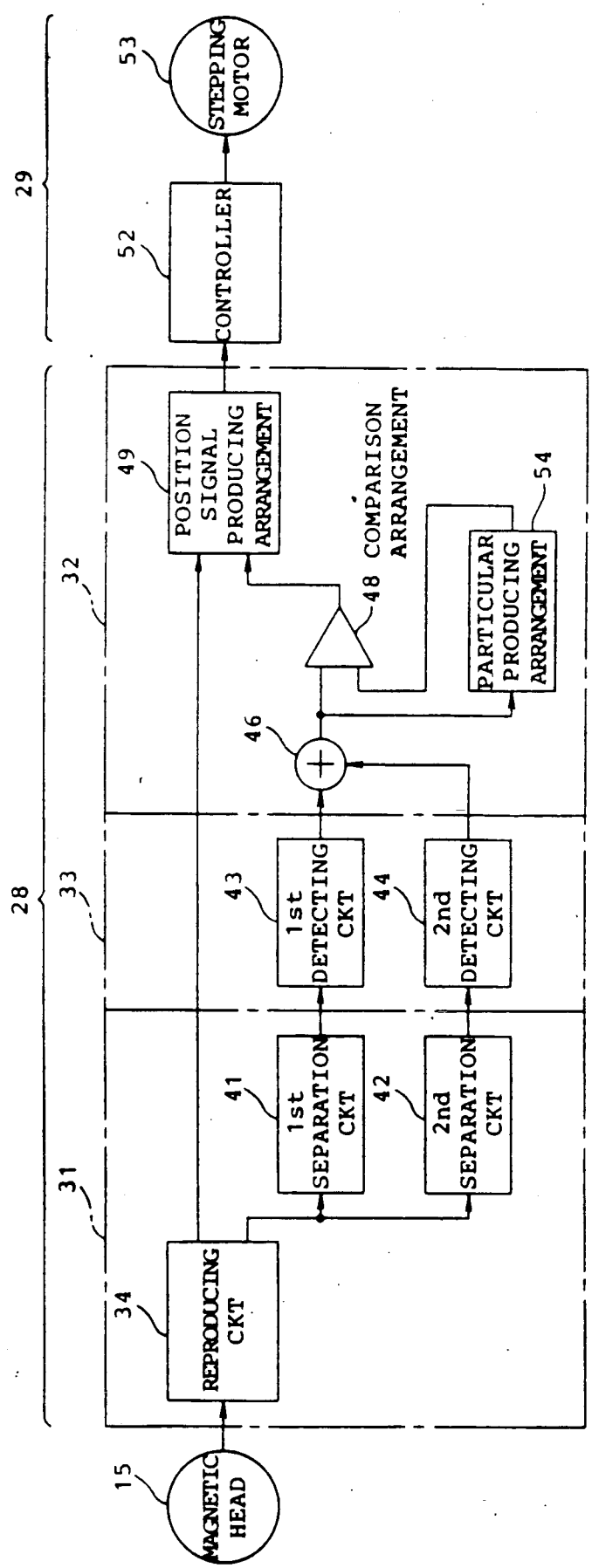
FIG. 5 is a block diagram of a modification of the position controlling unit shown in FIG. 2.

Referring to FIG. 5, description will be directed to a modification of the position controlling unit illustrated with reference to FIG. 2. The modification comprises similar parts designated by like reference numerals. The second internal producing arrangement 32 comprises a particular producing arrangement 54 in place of the determining arrangement 47 described in conjunction with FIG. 2. The particular producing arrangement 54 is coupled to the calculation arrangement 46 and is supplied with the result signal from the calculation arrangement 46.

The result signal is processed into a particular reference signal by the particular producing arrangement 54. The particular reference signal has a particular level of, for example, a half of a maximum value of the result signal. Therefore, the particular value fluctuates in response to the maximum value.

The result signal is compared with the particular reference signal in the comparison arrangement 48. Only when the value of the result signal is lower than the particular level, the comparison arrangement 48 produces the information signal.

Figure 6:
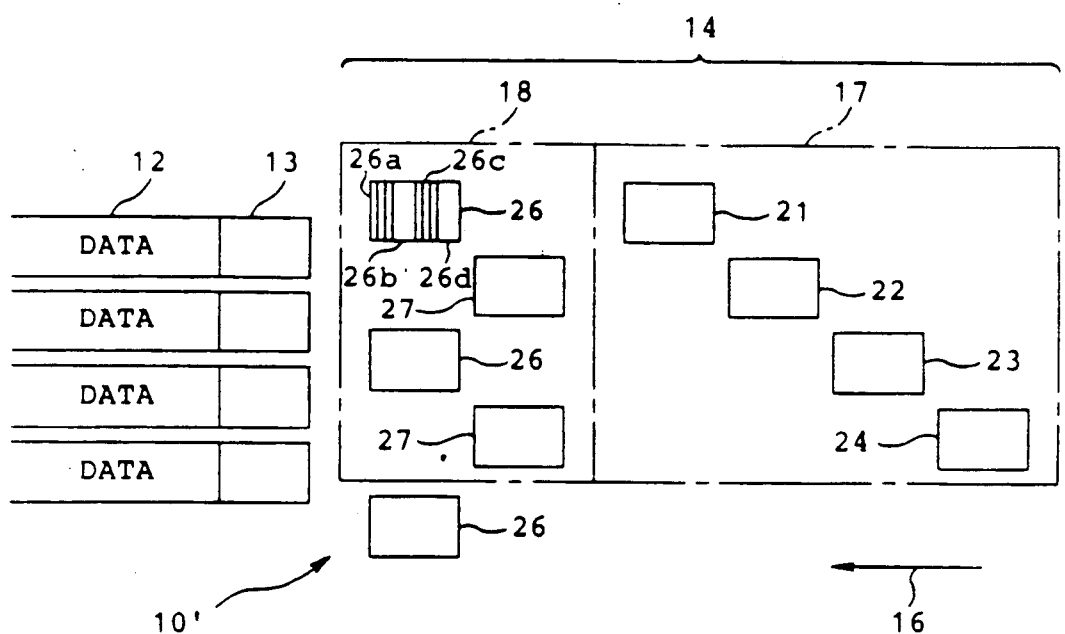
FIG. 6 is another partial top view of a recording medium.

Referring to FIG. 6, description will be made as regards a modification 10' of the magnetic floppy disk 10 illustrated with reference to FIG. 1. The modification 10' comprises similar parts designated by like reference numerals. In the supplementary area 18, the primary identification parts 26 are displaced from the secondary identification parts 27 in the predetermined sense 16. When the primary and the secondary identification parts 26 and 27 are accessed, the magnetic head produces the first and the second supplementary detection signals. In this event, the first supplementary detection signal precedes the second supplementary detection signal.

Figure 7:
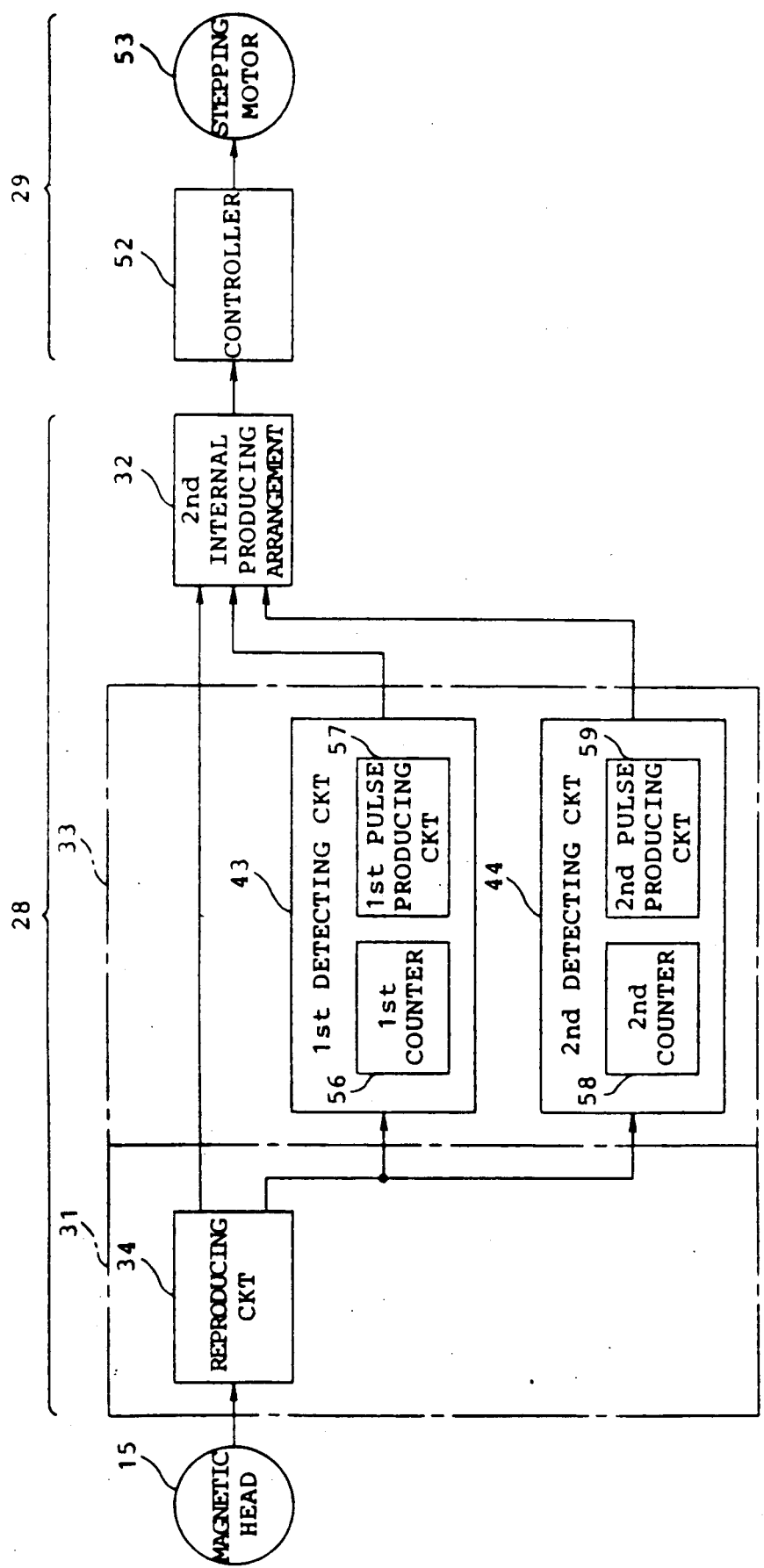
FIG. 7 is a block diagram of a position controlling unit according to a second embodiment of this invention.
Figure 8:
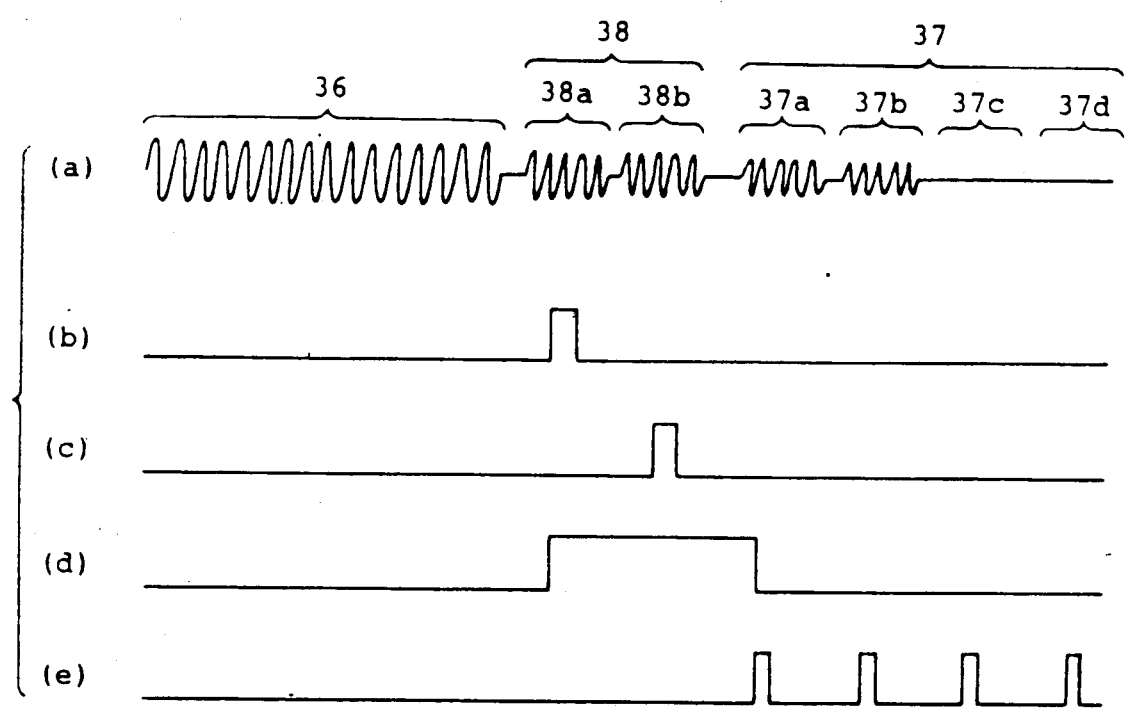
FIG. 8 is a time chart for use in describing operation of the position controlling unit illustrated in FIG. 7.

Referring to FIGS. 7 and 8 together with FIG. 6, description will be directed to a position controlling unit according to a second embodiment of the present invention. The position controlling unit comprises similar parts designated by like reference numerals. The position controlling unit uses the modification 10' of the magnetic floppy disk.

When the magnetic head accesses each of the primary identification parts 26, the reproducing circuit 34 produces a first succession of pulses 38a depicted in FIG. 8 along a top line labelled (a). The pulses 38a collectively serve as the first supplementary local signal. When the magnetic head accesses each of the secondary identification parts 27, the reproducing circuit 34 produces a second succession of pulses 38b depicted along the top line (a). The pulses 38b collectively serve as the second supplementary local signal. The pulses 38a and 38b are successively and directly supplied to each of the first and the second detecting circuits 43 and 44.

The first detecting circuit 43 comprises a first counter 56 and a first pulse producing circuit 57. The first counter 56 is for counting the pulses 34a and 34b and produces a first count signal. Responsive to the first count signal, the first pulse producing circuit 57 produces a first local pulse depicted along a line labelled (b). The first local pulse serves as the first local detection signal. The second detecting circuit 44 comprises a second counter 58 and a second pulse producing circuit 59. The second counter 58 is for counting the pulses 34a and 34b and produces a second count signal. Responsive to the second count signal, the second pulse producing circuit 59 produces a second local pulse depicted along a line labelled (c). The second local pulse serves as the second local detection signal.

The first and the second local pulses have a predetermined time interval therebetween and is supplied to the second internal producing arrangement 32. Responsive to one of the first and the second local pulse, the second internal producing arrangement 32 produces the information signal of a predetermined pulse width depicted along a line labelled (d). When the information signal appears with the predetermined pulse width, the second internal producing arrangement 32 produces the pulse signal succession depicted along a line labelled (e).

Responsive to the pulse signal succession, the second internal producing arrangement 32 produces the position signal in the manner known in the art. It is a matter of course that the control arrangement 29 controls the magnetic head 15 in the first predetermined direction with reference to the position signal.

Referring to FIGS. 6 and 7 again, description will be made as regards a modification of the position controlling unit illustrated with reference to FIG. 7. In the manner depicted in FIG. 6 partly on an enlarged scale, each of the primary identification parts 26 has a primary initializing portion 26a, a primary preceding gap portion 26b, a primary signal portion 26c, and a primary succeeding gap portion 26d arranged in order in a reverse sense which is reverse relative to the predetermined sense 16. Each of the secondary identification parts 27 has a secondary initializing, a secondary preceding gap, a secondary signal, a secondary succeeding gap portion arranged in order in the reverse sense.

Each of the primary and the secondary initializing portions is for initializing each of the first and the second counters 56 and 58. Each of the primary and the secondary signal portions is for making each of the first and the second counters 56 and 58 carries out a counting operation. Each of the primary preceding, the primary succeeding, the secondary preceding, and the secondary succeeding gap portions serves as a substantial gap portion to ensure the counting operation.

When the primary initializing portion 26a is accessed by the magnetic head 15, the reproducing circuit 34 produces two pulses, each of which has a first pulse width of, for example, two microseconds. When the primary preceding gap portion 26b is accessed by the magnetic head 15, the reproducing circuit 34 produces eight pulses, each of which has a second pulse width of, for example, four microseconds. When the primary signal portion 26c is accessed by the magnetic head 15, the reproducing circuit 34 produces three pulses each of which has a third pulse width of, for example, five microseconds. When the primary succeeding gap portion 26d is accessed by the magnetic head 15, the reproducing circuit 34 produces five pulses each of which has a fourth pulse width of, for example, four microseconds.

When the secondary initializing portion is accessed by the magnetic head 15, the reproducing circuit 34 produces two pulses each of which has the first pulse width. When the secondary preceding gap portion is accessed by the magnetic head 15, the reproducing circuit 34 produces four pulses each of which has the second pulse width. When the secondary signal portion is accessed by the magnetic head 15, the reproducing circuit 34 produces six pulses each of which has the third pulse width. When the secondary succeeding gap portion is accessed by the magnetic head 15, the reproducing circuit 34 produces five pulses each of which has the fourth pulse width.

When the first counter 56 becomes to have a count of three, the first pulse producing circuit 57 produces the first local pulse. When the second counter 58 becomes to have a count of six, the second pulse producing circuit 59 produces the second local pulse.

It will be assumed that the reproducing circuit 34 produces another number of pulses which is different from each of the primary and the secondary predetermined numbers. By way of example, the first detecting circuit 43 is designed so that the first pulse producing circuit 57 produces the first local pulse even if the first counter 56 counts the count of two or four. The second detecting circuit 44 is designed so that the second pulse producing circuit 59 produces the second local pulse even if the second counter 56 counts the count of five or seven.

While the present invention has thus far been described in connection with only a few embodiments thereof, it will readily be possible for those skilled in the art to put this invention into practice in various other manners. For example, a hard magnetic disk may be used as the recording medium.

What is claimed is:

1. In a position controlling unit for controlling a relative position between a magnetic head and a recording medium having a predetermined tracking axis and a control area indicative of said predetermined tracking axis, said magnetic head being for detecting said control area to produce a detection signal, said unit including producing means responsive to said detection signal for producing a position signal representative of said relative position, and control means responsive to said position signal for controlling said relative position in a predetermined direction which intersects said predetermined tracking axis and which extends along said recording medium, the improvement wherein said producing means comprises:

first internal producing means coupled to said magnetic head and responsive to said detection signal for producing a first internal signal;

processing means coupled to said first internal producing means for processing said first internal signal into a second internal signal; and second internal producing means coupled to said first internal producing and said processing means and responsive to said first and second internal signals for producing said position signal;

said control area having a main area and a supplementary area preceding said main area, said main area being indicative of said predetermined tracking axis, said magnetic head being for detecting said main and said supplementary areas to produce a main and a supplementary detection signal, wherein:

said first internal producing means comprises:

main producing means coupled to said magnetic head and responsive to said main detection signal for producing a main local signal; and supplementary producing means coupled to said magnetic head and responsive to said supplementary detection signal for producing a supplementary local signal;

said main and said supplementary local signal collectively serving as said first internal signal;

said processing means comprises:

internal processing means coupled to said supplementary producing means for processing said supplementary local signal into said second internal signal; and means coupled to said main producing and said second internal producing means for sending said main local signal to said second internal producing means;

said second internal producing means being responsive to said main local and said second internal signals for producing said position signal;

said supplementary area having a first and a second identification part, said first identification part being placed at a first predetermined position preceding said main area, said second identification part being placed at a second predetermined position which precedes said main area and is displaced from said first predetermined position in said predetermined direction, said magnetic head being for detecting said first and said second identification parts to produce a first and a second supplementary detection signal, wherein:

said supplementary producing means comprises:

first supplementary producing means coupled to said magnetic head and a responsive to said first supplementary detection signal for producing a first supplementary local signal; and second supplementary producing means coupled to said magnetic head and responsive to said second supplementary detection signal for producing a second supplementary local signal;

said first and said second supplementary local signals collectively serving as the supplementary local signal;

said internal processing means comprises:

first detecting means coupled to said first supplementary producing means for detecting said first supplementary local signal to produce a first local detection signal; and second detecting means coupled to said second supplementary producing means for detecting said second supplementary local signal to produce a second local detection signal; and wherein said second internal processing means comprises:

means for combining said first and said second local detection signals into said second internal signal.

2. A position controlling unit as claimed in claim 1, said first and said second identification parts being placed on a predetermined axis which is substantially perpendicular to said predetermined tracking axis and extends along said recording medium, wherein said supplementary producing means further comprises discriminating means coupled to said first and said second supplementary producing means for discriminating said first supplementary local signal from said second supplementary local signal.

3. A position controlling unit as claimed in claim 1, wherein said second internal producing means comprises:

carrying out means coupled to said first and said second detecting means for carrying out a predetermined operation on said first and said second local detection signals to produce and information signal; and means coupled to said main producing means and said carrying out means and responsive to said main local and said information signals for producing said position signal.

4. A position controlling unit claimed in claim 3, wherein said carrying out means comprises:

calculation means coupled to said first and said second detecting means for carrying out a predetermined calculation on said first and said second local detection signals to produce a result signal; and local producing means coupled to said calculation means and responsive to said result signal for producing said information signal.

5. A position controlling unit as claimed in claim 4, wherein said local producing means comprises:

determining means for determining a reference signal having a level which is constant; and comparison means coupled to said calculation means and said determining means for comparing said result signal with said reference signal to produce a predetermined pulse signal as said information signal.

6. A position controlling unit as claimed in claim 4, wherein said local producing means further comprises:

particular producing means coupled to said calculation means and responsive to said result signal for producing a reference signal; and comparison means coupled to said calculation means and said particular producing means for comparing said result signal with said reference signal to produce a predetermined pulse signal as said information signal.

7. A position controlling unit as claimed in claim 3, said first predetermined position being displaced from said second predetermined position in a secondary direction which is parallel to said predetermined tracking axis, wherein said carrying out means comprises pulse producing means coupled to said first and said second detecting means and responsive to one of said first and said second local detection signals for producing a predetermined pulse signal as said information signal.

8. A position controlling unit as claimed in claim 1, wherein:

said first supplementary producing means is for producing a first succession of pulses as said first supplementary local signal;

said second supplementary producing means being for producing a second succession of pulses as said second supplementary local signal;

said first detecting means comprising:

first counter means coupled to said first supplementary producing means for counting the pulses of said first succession to produce a first count signal; and first pulse producing means coupled to said first counter means and responsive to said first count signal for producing a first local pulse as said first local detection signal;

said second detecting means comprising:

second counter means coupled to said second supplementary producing means for counting the pulses of said second succession to produce a second count signal; and second pulse producing means coupled to said second counter means and responsive to said second count signal for producing a second local pulse as said second local detection signal.

* * * * *